(12) United States Patent
Richardson et al.

(10) Patent No.: US 10,382,123 B2
(45) Date of Patent: Aug. 13, 2019

(54) TECHNIQUES FOR PARAMETER REPORTING OF ELEMENTS IN AN OPTICAL TRANSMISSION SYSTEM USING HIGH LOSS LOOPBACK (HLLB) DATA AND A LINE MONITORING SYSTEM IMPLEMENTING THE SAME

(71) Applicant: SubCom, LLC, Eatontown, NJ (US)

(72) Inventors: Lee Richardson, Freehold, NJ (US); Georg Heinrich Mohs, East Brunswick, NJ (US); Yunlu Xu, Howell, NJ (US); Richard Kram, Ocean, NJ (US); Lara Denise Garrett, Red Bank, NJ (US); Jonathan M. Liss, Marlboro, NJ (US); Dmitry Kovsh, Holmdel, NJ (US)

(73) Assignee: SubCom, LLC, Eatontown, NJ (US)

( * ) Notice: Subject to any disclaimer, the term of this patent is extended or adjusted under 35 U.S.C. 154(b) by 0 days.

(21) Appl. No.: 15/870,311

(22) Filed: Jan. 12, 2018

(65) Prior Publication Data

US 2019/0222307 A1  Jul. 18, 2019

(51) Int. Cl.
*H04B 10/035* (2013.01)
*H04B 10/071* (2013.01)

(52) U.S. Cl.
CPC ......... *H04B 10/035* (2013.01); *H04B 10/071* (2013.01)

(58) Field of Classification Search
CPC .... H04B 10/035; H04B 10/071; H04B 10/00; H04B 10/0777; H04B 10/07; H04B 10/0797

See application file for complete search history.

(56) References Cited

U.S. PATENT DOCUMENTS

| | | | |
|---|---|---|---|
| 6,134,032 A | 10/2000 | Kram et al. | |
| 2007/0041006 A1 | 2/2007 | Abbott | |
| 2009/0028549 A1* | 1/2009 | Zhang | H04B 10/035 398/16 |
| 2009/0028550 A1* | 1/2009 | Zhang | H04B 10/035 398/16 |
| 2009/0202237 A1* | 8/2009 | Zhang | H04B 10/035 398/6 |
| 2013/0129343 A1 | 5/2013 | Kram et al. | |

OTHER PUBLICATIONS

Supplementary European Search Report dated May 24, 2019 for corresponding European Patent application No. 19150852.2.

* cited by examiner

*Primary Examiner* — Ted M Wang

(57) ABSTRACT

A system and method consistent with the present disclosure provides for automated line monitoring system (LMS) baselining that enables capturing and updating of operational parameters specific to each repeater and associated undersea elements based on high loss loopback (HLLB) data. The captured operational parameters may then be utilized to satisfy queries targeting specific undersea elements in a Command-Response (CR) fashion. Therefore, command-response functionality may be achieved without the added cost, complexity and lifespan issues related to deploying undersea elements with on-board CR circuitry. As generally referred to herein, operational parameters include any parameter that may be derived directly or indirectly from HLLB data. Some example non-limiting examples of operational parameters include span gain loss, input power, output power, gain, and gain tilt.

15 Claims, 9 Drawing Sheets

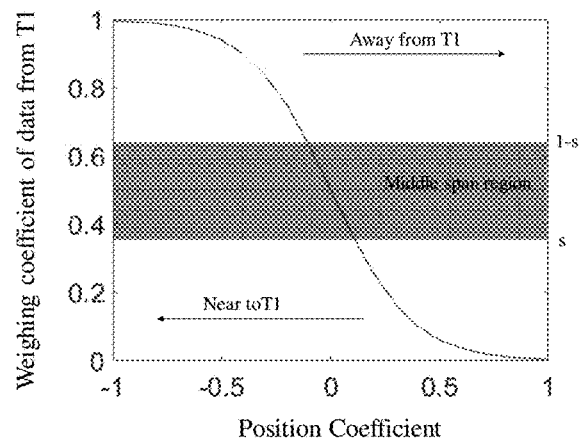
FIG. 5
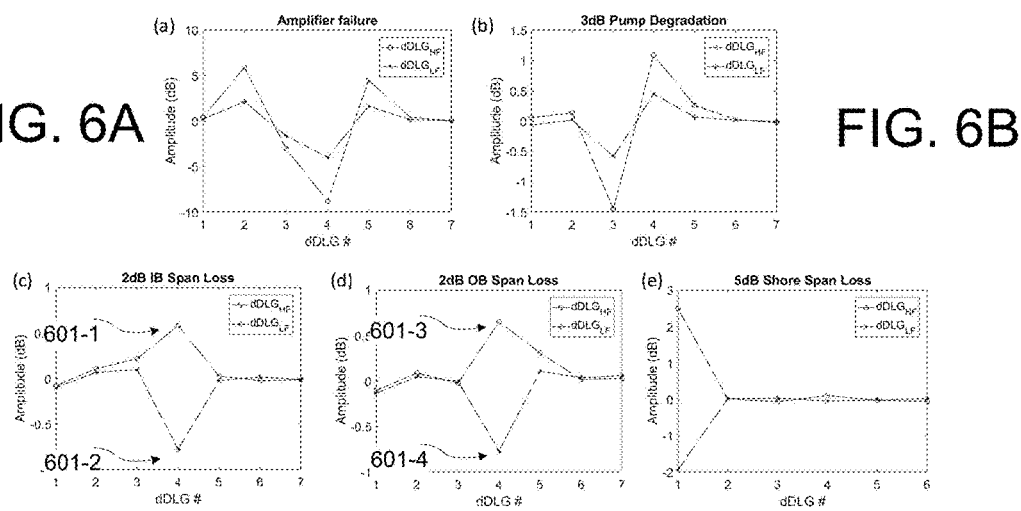
FIG. 6A  FIG. 6B
FIG. 6C  FIG. 6D  FIG. 6E

| LMP Source | Amplifier Name | Span Loss (dB) | P_in (dBm) | P_out (dBm) | Gain (dB) | Tilt (dB) | Span Loss (dB) | P_in (dBm) | P_out (dBm) | Gain (dB) | Tilt (dB) | Span Length (km) |
|---|---|---|---|---|---|---|---|---|---|---|---|---|
| | R1 | 10 | 10 | 20 | 10 | 0 | 10 | 10 | 20 | 10 | 0 | 60 |
| | R2 | 10 | 10 | 20 | 10 | 0 | 10 | 10 | 20 | 10 | 0 | 60 |
| | R3 | 10 | 10 | 20 | 10 | 0 | 10 | 10 | 20 | 10 | 0 | 60 |
| | R4 | 10 | 10 | 20 | 10 | 0 | 10 | 10 | 20 | 10 | 0 | 60 |
| | R5 | 10 | 10 | 20 | 10 | 0 | 10 | 10 | 20 | 10 | 0 | 60 |
| | R6 | 10 | 10 | 20 | 10 | 0 | 10 | 10 | 20 | 10 | 0 | 60 |

TECHNIQUES FOR PARAMETER REPORTING OF ELEMENTS IN AN OPTICAL TRANSMISSION SYSTEM USING HIGH LOSS LOOPBACK (HLLB) DATA AND A LINE MONITORING SYSTEM IMPLEMENTING THE SAME

TECHNICAL FIELD

The present application relates to communication systems and, more particularly, to a system and method for utilizing high loss loopback (HLLB) data to measure and report operating parameters of repeaters and other elements in an undersea fiber optic network.

BACKGROUND

Subsea fiber optical communications systems need routine monitoring to guarantee their performance and minimize potential loss of service by detecting and solving wet plant faults and possibly aggressive threats at an early stage. Currently established monitoring technologies include the use of line monitoring systems (LMS) to detect signal peaks looped back from each undersea repeater and terminal with high loss loopback (HLLB) technology.

When there is a change in performance along the optical path, the amplitudes of these loopback signals change in the repeaters surrounding the fault location. The changes present distinct patterns which may be utilized to identify fault conditions. Such fault conditions include, for example, changes in fiber span loss, changes in optical amplifier pump laser output power, and fiber breaks. Some approaches to recognizing fault conditions based on a corresponding fault signature include utilizing automatic signature analysis (ASA). Existing ASA-based fault analysis can detect relatively large changes in the transmission system, but often lack accuracy to report small changes that may indicate degraded performance of a particular element over time.

Some undersea transmission systems utilize repeaters with Command-Response (CR) features that allow for operational parameters such as output power and input power to be queried directly from each repeater. However, Command-Response requires specialized hardware within each repeater that can significantly increase unit costs and reduce operational lifespan, which is particularly problematic in an undersea environment that makes repairs impractical.

BRIEF DESCRIPTION OF THE DRAWINGS

Reference should be made to the following detailed description which should be read in conjunction with the following figures, wherein like numerals represent like parts:

FIG. 5 is a graph that shows measured differential of differential loop gains (dDLG) mapped to a position coefficient from −1 to 1 and associated weighting coefficients relative to terminal T1, in accordance with an embodiment of the present disclosure.

FIGS. 6A to 6E show example fault signatures for fault conditions that may be detected by an LME consistent with the present disclosure.

DETAILED DESCRIPTION

In general, a system and method consistent with the present disclosure provides for automated line monitoring system (LMS) baselining that enables capturing and updating of operational parameters specific to each repeater and associated undersea elements based on high loss loopback (HLLB) data. The captured operational parameters may then be utilized to satisfy queries targeting specific undersea elements in a Command-Response (CR) fashion. Therefore, command-response functionality may be achieved without the added cost, complexity and lifespan issues related to deploying undersea elements with on-board CR circuitry. As generally referred to herein, operational parameters include any parameter that may be derived directly or indirectly from HLLB data. Some example, non-limiting examples of operational parameters include span gain loss, input power, output power, gain, and gain tilt.

Figure 1:
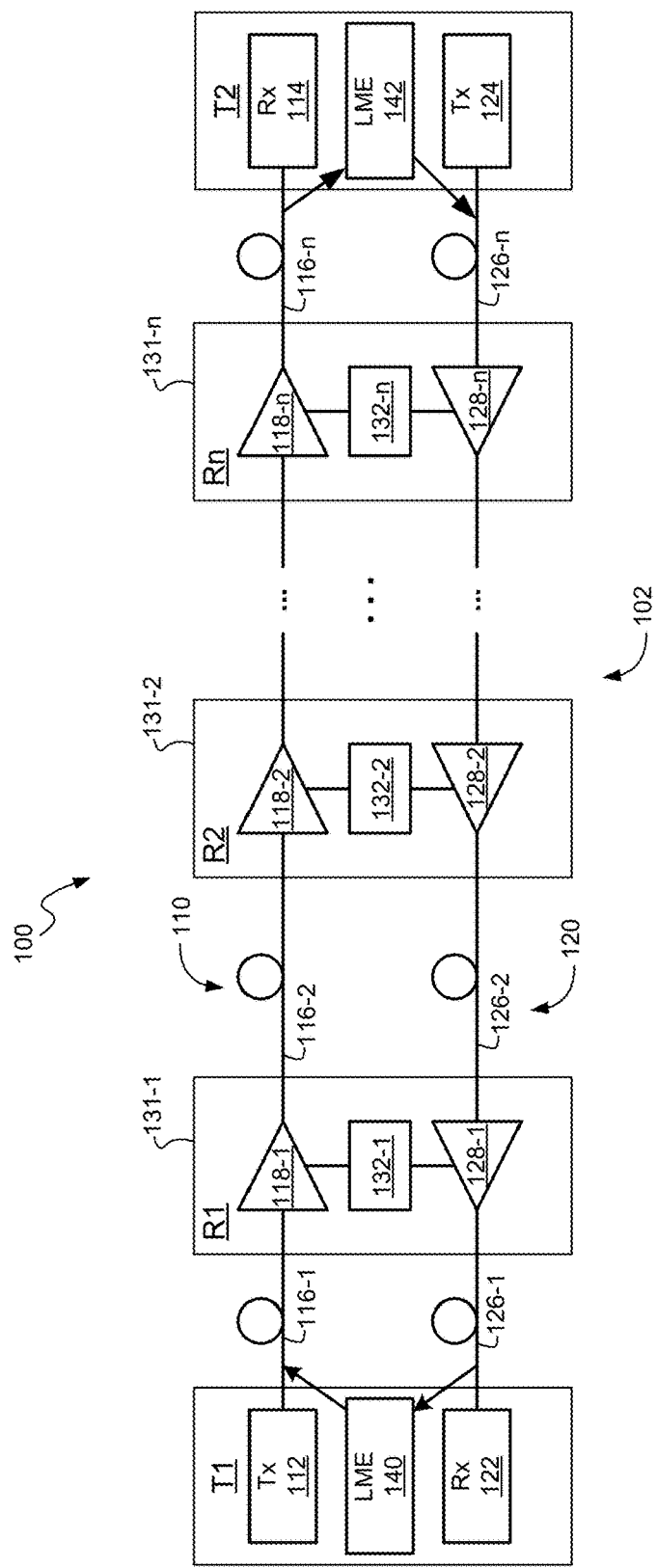
FIG. 1 is a simplified block diagram of one exemplary embodiment of a system consistent with the present disclosure.

FIG. 1 is a simplified block diagram of one exemplary embodiment of WDM transmission system 100 consistent with the present disclosure. In general, the system 100 may be configured to calculate a loop gain value associated with each repeater/amplifier using LMS signals sent from both ends of a bi-directional transmission path 102. Those of ordinary skill in the art will recognize that the system 100 has been depicted as a highly simplified point-to-point system form for ease of explanation. It is to be understood that a system and method consistent with the present disclosure may be incorporated into a wide variety of network components and configurations. The illustrated exemplary embodiments herein are provided only by way of explanation, not of limitation.

As shown, the system 100 may include a first terminal T1 and second terminal T2 coupled by two unidirectional optical paths 110, 120, which together form the bi-directional optical transmission path 102. The first terminal T1 is coupled to a first end of the transmission path 102 and the second terminal T2 is coupled to a second end of the transmission path 102. The term "coupled" as used herein refers to any connection, coupling, link or the like by which signals carried by one system element are imparted to the "coupled" element. Such "coupled" devices are not necessarily directly connected to one another and may be separated by intermediate components or devices that may manipulate or modify such signals.

The optical path 110 may carry optical data on a plurality of channels (or wavelengths) in one direction from a transmitter 112 in the terminal T1 to a receiver 114 in the terminal T2. The optical path 120 may carry optical data on a plurality of channels (or wavelengths) in a direction opposite from the direction associated with path 110 from a transmitter 124 in the terminal T2 to a receiver 122 in the terminal T1. With respect to terminal T1, the optical path 110 is an outbound path and the optical path 120 is an inbound path. With respect to terminal T2, the optical path 120 is an outbound path and the optical path 110 is an inbound path. The optical path 110 may include an alternating concatenation of optical fibers 116-1 to 116-n and optical amplifiers 118-1 to 118-n, and the optical path 120 may include an alternating concatenation of optical fibers 126-1 to 126-n and optical amplifiers 128-1 to 128-n.

The optical path pair (e.g., optical paths 110, 120) may include sets of amplifier pairs 118-1 to 118-n and 128-1 to 128-n disposed within housings 131-1 to 131-n of associated repeaters R1 . . . Rn and connected by pairs of optical fibers 116-1 to 116-n and 126-1 to 126-n. The pairs of optical fibers 116-1 to 116-n and 126-1 to 126-n may be included in an optical fiber cable together with fibers supporting additional path pairs. Each repeater R1 . . . Rn may include a pair of amplifiers 118-1 . . . 118-n and 128-1 . . . 128-n for each supported path pair. Optical amplifiers 118-1 . . . 118-n and 128-1 . . . 128-n are illustrated in simplified form may include one or more erbium doped fiber amplifiers (EDFAs) or other rare earth doped fiber amplifiers, Raman amplifiers or semiconductor optical amplifiers. A HLLB path 132-1 to 132-n may be coupled between optical paths 110, 120, for example, in one or more of the housings 131-1 to 131-n of the repeaters R1 . . . Rn, and may include, for example, one or more passive optical coupling components, as will be described in greater detail below.

Line monitoring equipment (LME) 140, 142 may be located at both of the terminals T1, T2 to provide HLLB monitoring of the path pair 110, 120. The LME 140 may launch one or more LME test signals, e.g. at different wavelengths and/or different frequencies, into one optical path 110 (e.g., an outbound optical path). Each of the HLLB paths 132-1 to 132-n may couple a sample of the LME test signals propagating in optical path 110 into the forward propagating direction of the other optical path 120 (e.g., an inbound optical path). The LME 140 may then receive and measure the samples to detect changes in loop gain as an indication of a fault in the system. The received samples of the LME test signals received through HLLB paths 132-1 to 132-n in response to LME test signals are referred to herein as HLLB loopback data or simply loopback data.

The LME 142 may launch one or more LME test signals, e.g. at different wavelengths and/or different frequencies, into one optical path 120 (e.g., an outbound optical path). HLLB paths 132-1 to 132-n may couple a sample of the LME test signals propagating in optical path 120 into the forward propagating direction of the other optical path 110 (e.g., an inbound optical path). The LME 142 may then receive and measure the samples (loopback data) to detect changes in loop gain as an indication of a fault in the system. A variety of transmitter and receiver configurations for the LME 140, 142 for transmitting LME test signals and receiving and measuring loopback data are known.

A variety of HLLB path configurations useful in a system consistent with the present disclosure are known. Also, although the each of the repeaters R1 . . . Rn is shown is shown as having an associated HLLB path 132-1 to 132-n, the HLLB paths may be located in other locations and/or may not be located in every repeater R1 . . . Rn. In some embodiments, the HLLB paths 132-1 to 132-n may be symmetric in operation, i.e., the function that describes the percent of optical power at each wavelength transferred from path 110 to path 120 by a HLLB path 132-1 is the same as the function that describes the percent of optical power at each wavelength transferred from path 120 to path 110 by the HLLB path 132-1. Alternatively, one or more HLLB paths may not be symmetric and different HLLB paths may have different transfer functions.

For example, each of the pairs of amplifiers 118-1 to 118-n and 128-1 to 128-n include a pumping scheme to facilitate the process of detecting optical performance changes in the monitored path. In this example, each of the amplifier pairs may be configured with an asymmetric pumping configuration whereby each amplifier in a given amplifier pair has an output power different than the other. The asymmetric pumping scheme may therefore be utilized to assign a direction to a particular measured change, and to identify the particular element that may be associated with the change. For example, a single repeater may have two amplifiers, e.g., A1 and A2, to amplify signals in each direction. The two amplifiers A1 and A2 may be pumped by two similarly-configured lasers, e.g., L1 and L2. In this example, A1 may be pumped by 50% L1 and 50% L2. A2 may also be pumped in a similar fashion by its respective lasers. In contrast, asymmetrical pumping can include A1 being pumped by, for instance, 40% L1 and 60% L2, although other ratios are within the scope of this disclosure. Likewise, A2 may be pumped by 60% L1 and 40% L2.

Figure 2:
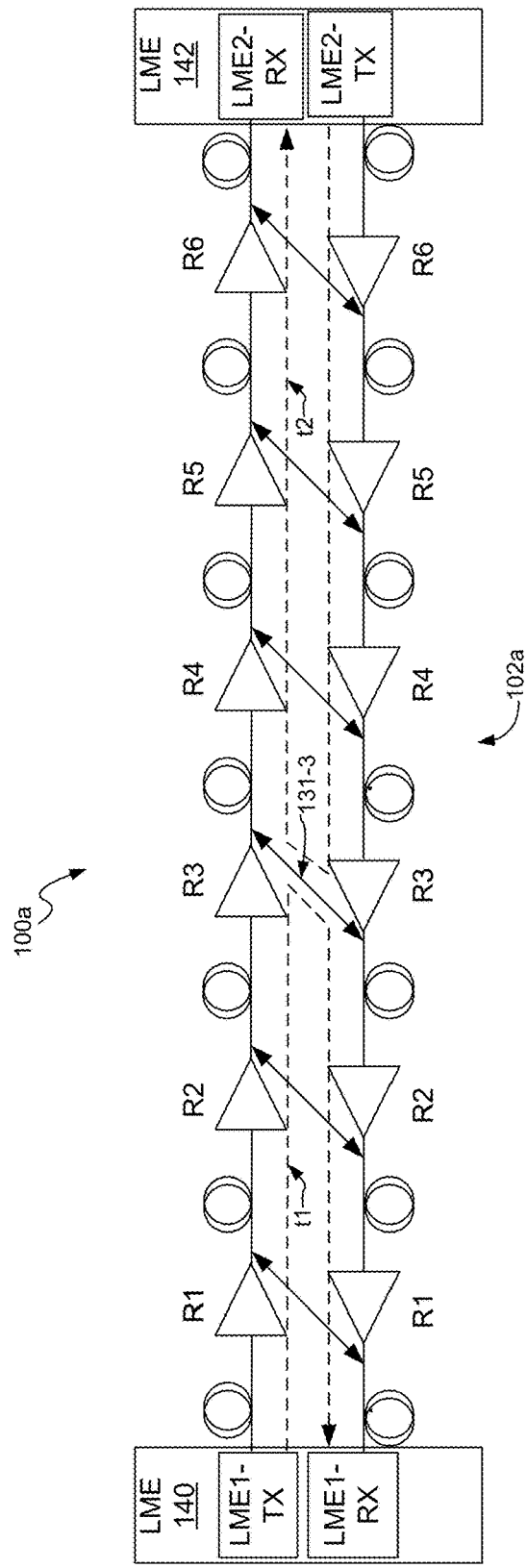
FIG. 2 simplified block diagram of another exemplary embodiment of a system consistent with the present disclosure.
Figure 3A:
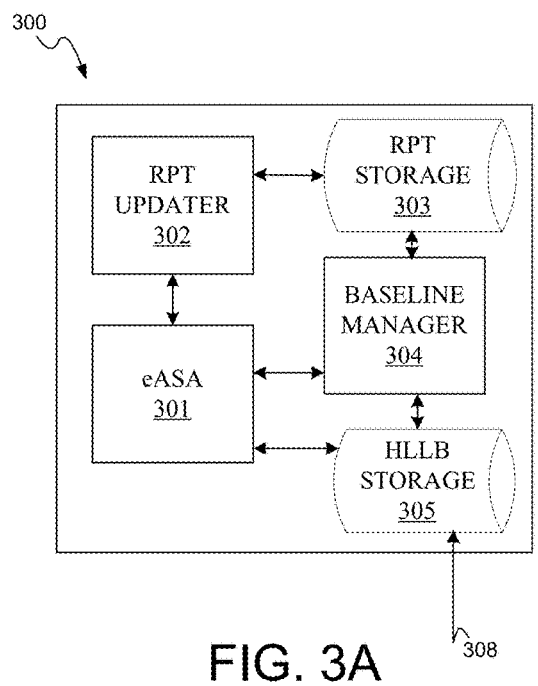
FIG. 3A is a simplified block diagram of line monitoring equipment (LME) system consistent with the present disclosure.

FIG. 3A shows an example line monitoring system (LMS) 300 consistent with an embodiment of the present disclosure. The LMS 300 may be suitable for use in the LME 140 and/or LME 142 of FIGS. 1 and 2. LMS 300 is shown in a highly simplified manner for purposes of clarity and not limitation. The LMS 300 may be implemented in hardware (e.g., circuitry), software, or a combination thereof. In an embodiment, the LMS 300 may be implemented at least in part as a plurality of instructions that may be executed by a controller (not shown) to carry out the LMS processes, e.g., process 1300 of FIG. 13. A controller, as generally referred to herein, may be implemented as a processor (e.g., x86 process), field programmable gate array (FPGA), an application-specific integrated circuit (ASIC), or any other suitable processing device/circuitry.

As shown, the LMS 300 includes an enhanced automatic signature analysis (eASA) processor 301, a reportable parameter table (RPT) updater 302, an RPT storage 303, a baseline manager component 304, and a high loss loopback (HLLB) storage 305. The RPT storage 303 and HLLB storage 305 may be implemented in a volatile or non-volatile memory area. Note, the components of LMS 300 may not be physically located in the same system and may be distributed throughout the WDM transmission system 100. For example, the RPT storage 303 and HLLB storage 305 may be located at terminal stations T1 and T2, respectively. Accordingly, LMSs consistent with the present disclosure may communicate with each other to share data and/or processing components depending on a desired configuration.

The LMS 300 may receive loopback data 308 (or LME loopback data 308) in the form of one or more LMS high loss loopback (HLLB) data sets from a transmission path in response to LME test signal(s) propagated on the network. Loopback data 308 may also be referred to as HLLB data sets or simply HLLB data. The loopback data 308 may then be stored in a memory that provides HLLB storage 305. As discussed in greater detail below, the eASA 301 can operate on differential HLLB data sets from multiple system endpoints (which may be referred to as terminal stations, or simply stations) and from multiple measurement times to provide results with improved accuracy relative to ASA approaches that operate on a single loopback data set. The eASA 301 may also detect changes near a terminal station/landing even when signatures of the same may be incomplete.

Figures 11, 12:
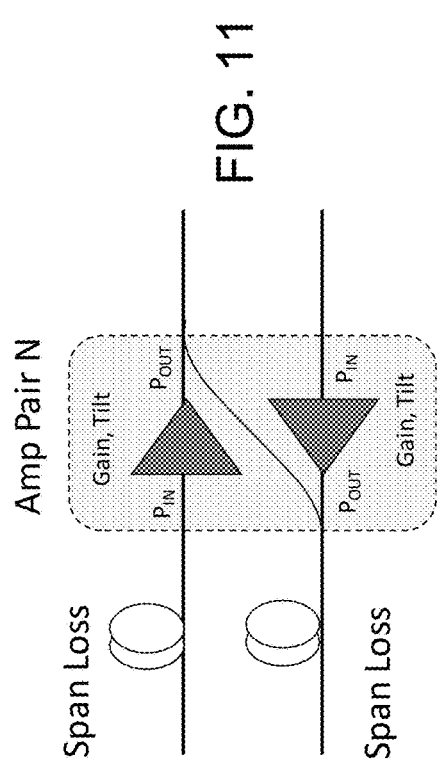
FIG. 11 shows an example amplifier pair of a repeater suitable for use in the optical transmission system of FIG. 1, in accordance with an embodiment of the present disclosure.
FIG. 12 shows one example reportable parameter table (RPT) in accordance with an embodiment of the present disclosure.

The RPT updater 302 (or RPT update model) may receive output from the eASA 301 and can map the output of the eASA 301 to operational parameters corresponding to one or more associated repeaters/elements of an optical transmission system, e.g., the WDM transmission system 100 of FIG. 1. As discussed further below, the RPT updater 302 can compare baseline RPT values to the values output by the eASA 301 to determine deltas, which in turn may be used to calculate changes to operational parameters. Thus, the RPT updater 302 may access RPT storage 303 to store operational parameters and any updated RPT baseline values based on the output of the eASA 301. One such example RPT table (or RPT lookup table) that may be updated and stored in the RPT storage 303 is shown in FIG. 12. The RPT data of the RPT storage may also be referred to as a current baseline RPT.

The baseline manager 304 may be configured to provide HLLB baseline data (which may also be referred to as LME baseline data) to the eASA 301. The HLLB baseline data may include a current HLLB baseline stored in the HLLB storage 305. During operation, the baseline manager 304 may maintain the current HLLB baseline data without modification, locally modify the baseline data based on detected faults/conditions that exceed a first predefined threshold, or may replace an entire HLLB baseline data set.

The baseline manager 304 may also be configured to provide/update baseline data stored in the RPT storage 303. During operation, the baseline manager 304 may maintain the current RPT baseline data without modification, locally modify the baseline data based on detected faults/conditions that exceed a first predefined threshold, or may replace an entire RPT baseline data set.

In an embodiment, the LMS 300 allows for periodic execution of monitoring and data reporting processes. During each monitoring cycle, the LMS 300 may receive new HLLB loopback data sets 308 from stations (e.g., based on LME test signals propagating along the WDM transmission system 100 as discussed above with reference to FIG. 2), and then perform automatic signature analysis on the received data sets using the eASA 301. The RPT updater 302 may then utilize the output of the eASA 301 and the current HLLB baseline from the baseline manager 304 to update the RPT table values stored in the RPT storage 303. A user may then query the LMS 300 in a command-response like fashion for monitoring results such as input power, output power, gain, span loss, and tilt. In turn, the LMS 300 may utilize the RPT data stored in the RPT storage 303 to satisfy the requests.

Figure 3B:
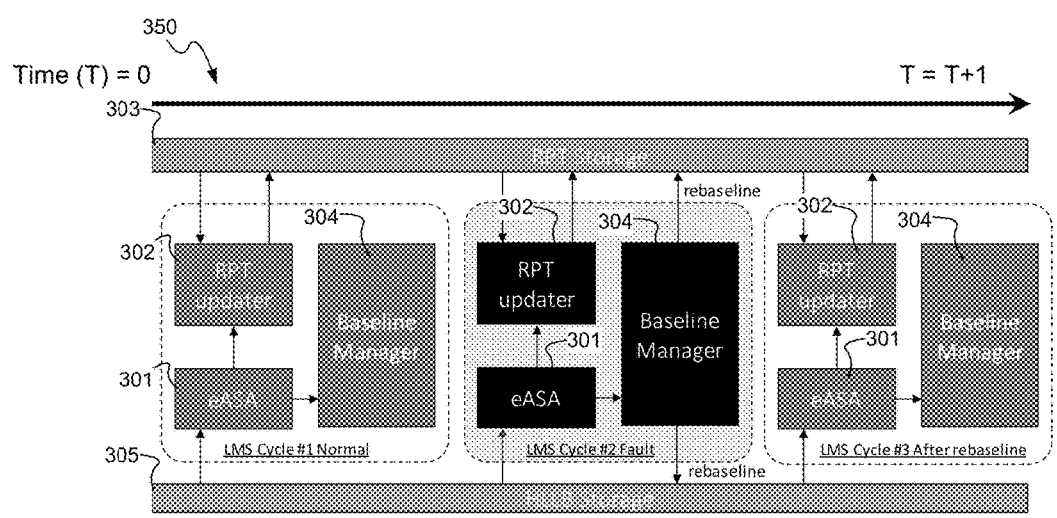
FIG. 3B shows an example workflow for the LME of FIG. 3A to perform periodic line monitoring, consistent with an embodiment of the present disclosure.

One example workflow 350 for the LMS 300 is shown in FIG. 3B. As shown, at time (T) zero, the eASA 301 receives one or more HLLB data sets and current HLLB baseline data from HLLB storage 305 as an input. Also at T=0, the RPT updater 302 receives RPT baseline data corresponding to the RPT table from RPT storage. The HLLB data sets may also be referred to as loopback data sets, and the HLLB baseline data may be referred to LMS baseline data. Continuing on, the eASA 301 then analyzes the received HLLB data sets and compares to the same to the current HLLB baseline data ($HLLB_{current}$) to determine one or more changes, e.g., based on a first predefined threshold (e.g., 1%, %5, 10%, or other suitable threshold). Any changes that exceed the first predefined threshold may be stored/updated in the current HLLB baseline data ($HLLB_{current}$) in a memory to generate new HLLB baseline data ($HLLB_{new}$). The changes between the old HLLB baseline data ($HLLB_{current}$) and the received HLLB data sets may also be used to generate first RPT delta values (RPTA) for changing the operational parameters of the RPT table. Changes between the new HLLB baseline data ($HLLB_{new}$) and the old HLLB baseline data ($HLLB_{current}$) may be used to generated changes for the RPT baseline data (RPTBaslineΔ). Before the changes are applied, a copy of the previous RPT baseline data may be stored in a memory ($RPTBaseline_{old}$). The new RPT baseline data may then be generated by summing values of the prior RPT baseline data ($RPTBaseline_{old}$) with corresponding values from the changed RPT baseline data (RPTBaslineΔ). Updated RPT parameters may then be calculated by summing the values of the previous RPT baseline data $RPTBaseline_{old}$ with corresponding values from the first RPT delta values (RPTA).

The eASA 301 then updates the RPT baseline data and then stores the same back into the RPT storage 303 to replace or otherwise adjust one or more operational parameters. Some such example operational parameters include input power, output power, gain, span loss, spectral tilt, and and/or span length for each amplifier and adjacent span represented within the one or more received HLLB data sets.

Continuing on with FIG. 3B, after a predetermined period of time (e.g., 10 minutes, an hour, a day, a week) the LMS 300 may receive one or more additional HLLB data sets during a subsequent LMS cycle. The eASA 301 may perform analysis on the HLLB data sets, and based on one or more measured operational parameters exceeding a predefined threshold, a fault condition may be detected. In the event of a detected fault, the baseline manager 304 may update one or more operational parameters in the RPT storage 303 and HLLB baseline data sets in the HLLB storage 305. For instance, an amplifier with a degraded output power may be detected by the eASA and an operational parameter value in the RPT table corresponding to the amplifier may be updated (see FIG. 12). Likewise, the HLLB baseline data may be updated to reflect the current operational status of the amplifier. Thus, even those a re-baselining has occurred for the loopback data, the RPT storage 303 can include an operational parameter which may be representative of the fault or potential fault.

HLLB Data Set Collection and Analysis

As discussed above with reference to FIGS. 1 and 2, the WDM transmission system 100 include high-loss loop-back optical paths in the bi-directional amplifier pairs in the undersea repeater bodies and in the terminal amplifiers. For the following discussion and formulas, each of the HLLB paths 132-1 to 132-n of FIG. 1 may be referenced using the notation $HLLB_{i,j}$, where i is the terminal and j is the loopback path. These optical paths route a small amount of light at specified test channel wavelengths from the optical fiber in one direction of transmission to the optical fiber in the reverse direction of transmission. These reflected round trip signals are detected by the LMS 300 in the terminal stations and converted or otherwise provided to the LMS 300 as loopback data 308.

This loopback data 308 can be measured for at least one optical frequency/wavelength within the transmission band of the optical path, and in some cases at two or more wavelengths. In one specific example embodiment, the high and low channel wavelengths (e.g., the minimum and maximum wavelengths, respectively) for a given bandwidth may be selected as the test signal channel wavelengths. Generation of the loopback data 308 may include measurement from each terminal site, e.g., T1 and T2. Thus, loopback data 308 may include multiple HLLB data sets. In some cases, the loopback data 308 may include at least one or more of a single data set for each branch fiber pairs, and two data sets from trunk fiber pairs, e.g., representing each direction of propagation. In addition, the loopback data 308 may include one or more data sets from target portion(s) of the WDM transmission system when a specific portion of the transmission system is monitored. Note, for C+L fiber pairs, HLLB data sets may be measured in both the C-band and L-band.

In an embodiment, accumulated noise along the transmission line that is represented within the loopback data 308 may be reduced or otherwise minimized. To this end, differential loop gain may be given by:

$$DLG_j = HLLB_{T1,j} - HLLB_{T1,j-1} = HLLB_{T2,j-1} - HLLB_{T2,j} \quad \text{Equation (1)}$$

The differential loop gain shows the optical gain of the amplifiers between two repeaters, as discussed above with regard to FIGS. 1 and 2. The differential loop gain data may then be compared to baseline differential loop gain data stored in the HLLB storage 305 to detect faults, as discussed above with regard to FIGS. 3A and 3B. Comparison may simply include subtracting the baseline's differential loop gain data from the differential loop gain data resulting from Equation (1) to derive the differential of differential loop gain. The differential of differential loop gain may therefore be given by:

$$dDLG_j = (DLG_j)_{Data} - (DLG_j)_{Baseline} \quad \text{Equation (2)}$$

Figure 4A:
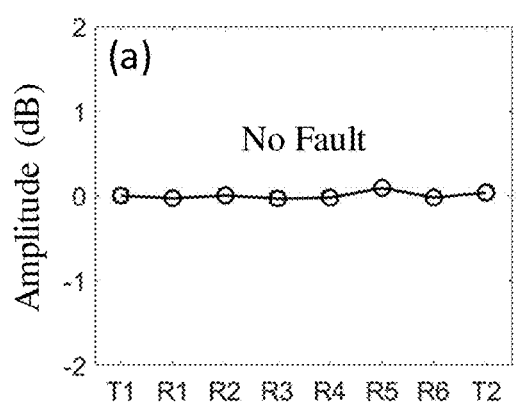
FIG. 4A is a graph showing differential gain data values for a plurality of repeaters for an optical transmission system without a detected fault condition, in accordance with an embodiment of the present disclosure.

In scenarios where the WDM transmission system 100 is without fault, the differential of differential loop gain values fluctuates at about zero. For example, as shown in FIG. 4A, the differential loop gain data values 404 are substantially zero. Note that the data points of FIG. 4A are shown after applying weighting to accommodate combining multi-site data sets, which is discussed in greater detail blow. For purposes of providing a non-limiting example, differential loop gain data values having an absolute amplitude value of 0.25 or less may be considered substantially zero, although other threshold values may be utilized depending on a desired level of sensitivity.

Figure 4B:
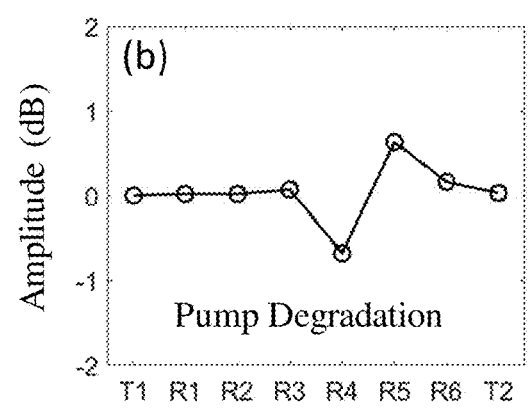
FIG. 4B is another graph that shows differential gain data values that correspond with a fault between repeaters of an optical transmission system consistent with an embodiment of the present disclosure.

On the other hand, a fault condition may cause differential loop gain data to have a unique signature, such as shown in FIG. 4B. In FIG. 4B, a pump within an amplifier disposed between R3 and R5 may be degraded and results in peak 405. The LMS 300 may include a plurality of predefined signatures to enable the eASA 301 to detect and classify associated error conditions. Alternatively, or in addition to predefined signatures, the LMS 300 may be trained over time with signatures provided by trained technicians/plant managers.

Band gain delta (BDG) may be defined as the difference of dDLGs of high and low frequencies:

$$BGD_j = (dDLG_j)_{LF} - (dDLG_j)_{HF} \quad \text{Equation (3)}$$

Although differential loop gain minimizes or otherwise reduces the influence of noise in long distance transmission, the error rate of data increases relative to measurement distance. For transmission systems with transmission path lengths of hundreds, thousands, or tens of thousands of kilometers, the error accumulation may be significant. In an embodiment, the introduction of error may be cancelled out by combining the HLLB data from multiple terminals. For instance, measurements from LME 140 of T1 may be combined with measurements from LME 142 of T2. The HLLB data from first and second terminal stations may therefore be given by:

$$dDLG_j = r_j(dDLG_j)_{T1} + (1 - r_j)(dDLG_j)_{T2} \quad \text{Equation (4)}$$

where $(dDLG_j)_{T1}$ is differential of differential loop gain from T1, $(dDLG_j)_{T2}$ is differential of differential loop gain from T2 and $r_j$ is the weighing factor of $dDLG_j$ from T1.

Each HLLB loopback position may then be mapped to the position coefficient ranging between −1 and 1 (see FIG. 5) using the following equation:

$$d = \frac{2n}{N-1} - 1 \quad \text{Equation (5)}$$

In an embodiment, a weighting factor may be applied to scale data depending on the configuration of the system. The weighing factor may be calculated by:

$$r_j = 1 - \frac{1}{1 + \exp(-aed)} \quad \text{Equation (6)}$$

where a is a scaling factor for the transmission system, and e is a mathematical constant equal to 2.71828. Note, the weighing factor may change based on a system configuration and the provided Equation (6) is not intended to be limiting. For instance, a discrete array of numbers may be utilized based on the particular configuration of the optical transmission system.

Also, a mid-span constant s may be defined, so that if $r_j$ falls outside [s, 1−s] and the difference between $(dDLG_j)_{T1}$ and $(dDLG_j)_{T2}$ are too large, then:

$$\frac{\max\{|(dDLG_j)_{T1}|, |(dDLG_j)_{T2}|\}}{\min\{|(dDLG_j)_{T1}|, |(dDLG_j)_{T2}|\}} \gg \quad \text{Equation (7)}$$

Then $r_j$ may be to be either 1 (if $r_j > 1-s$) or 0 (if $r_j < s$), as is shown in FIG. 5.

In an embodiment, fault signature analysis may be performed by an LMS, e.g., LMS 300, to identify and localize one or more fault types from HLLB data such as pump degradation, span loss, and so on. Such fault signature analysis may be performed on multi-span fault signatures that surround a specific physical fault location.

As discussed above, predetermined fault signatures may be stored in a memory of the LMS for comparison purposes during processes performed by the eASA 301, for example. The fault signatures may be based on, for instance, simulations or may be generated (trained) based on measured events occurring on the WDM transmission system 100 during operation. Differential of differential loop gain data, which can be calculated based on the baseline HLLB data sets for each measurement frequency, may also be stored in a memory, e.g., in HLLB storage 305, of each LMS for use during ASA analysis processes.

One example fault event/condition type the eASA 301 may detect includes degradation of output power of an optical pump laser, which enables the operation of optical amplifiers. The degradation may range from small decreases in output power to total failure of one or more pump lasers. Another example fault event type includes the degradation of fiber span attenuation. Fiber span attenuation may range from small increases in attenuation to significant attenuation increase that may adversely impact optical performance through the span/segment in question.

Figure 7:
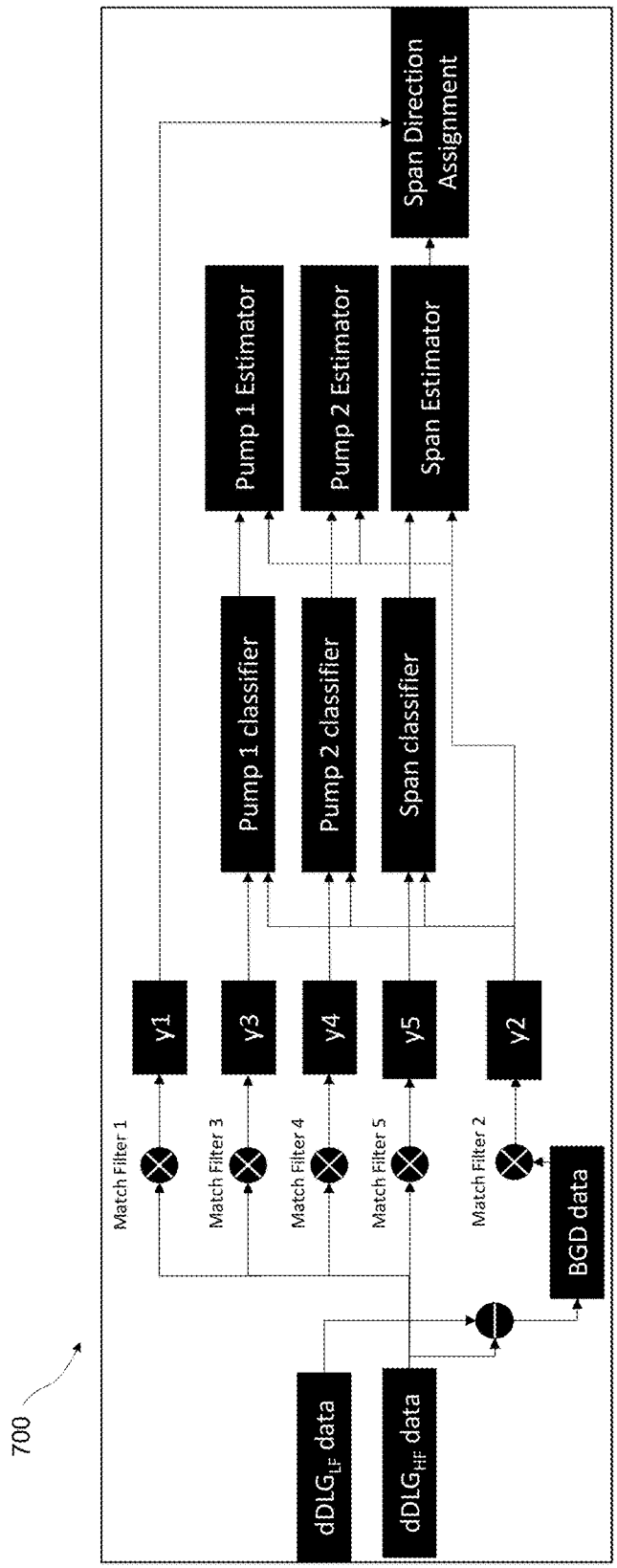
FIG. 7 is a block diagram of one example automatic signature analysis process in accordance with an embodiment of the present disclosure.

One example ASA process flow 700 that may be performed by the eASA 301 is shown in FIG. 7. During the process flow 700, a plurality of dimensional digital filters, e.g., with respective shapes based on known fault shapes for pump degradation, span loss, and so on, with the same lengths may be applied to the dDLG data resulting from Equation (4) and BGD data to offer preliminary results:

$$y1 = \text{filter}(F1, dDLG_{HF}) \quad \text{Equation (8)}$$

$$y4 = \text{filter}(F4, dDLG_{HF}) \quad \text{Equation (9)}$$

$$y5 = \text{filter}(F5, dDLG_{HF}) \quad \text{Equation (10)}$$

$$y3 = \text{filter}(F3, dDLG_{HF}) \quad \text{Equation (11)}$$

$$y2 = \text{filter}(F2, BGD) \quad \text{Equation (12)}$$

where y is the signal processed by filter F(Fx,Dy), where Fx is the shape of curve and Dy is the input data. As shown above, shapes x=3, 4 and 5 may correspond with pump degradation of laser L1, pump degradation of laser L2 and span loss. However, additional filters may be necessary as dDLG can interact filters F3 and F4 at a same instance in time, for example. In this case, it may not be possible to conclude as to whether the degradation is of laser L1 or laser L2. Thus, filter F2 is introduced such that F2 and F3 together can predict pump degradation of laser L1; F23 and F4 together can predict pump degradation of laser L2; and F2 and F5 can together predict span loss.

Continuing on, and in the event both the preliminary results of the processed dDLG data (y3, y4, y5) and the BGD data (y2) indicate substantially the same fault at substantially the same position (N), a fault is then recorded at j. Assuming that the summation of the amplitudes of the y2 near position j is:

$$\xi = \sum_{i=-3}^{2} y2(j+i) \quad \text{Equation (13)}$$

This disclosure has identified that this amplitude can mapped to the value of the fault (δ) using:

$$\delta = f(\xi) \quad \text{Equation (14)}$$

The function of y=f (x) can be fitted by varying the amplitude of the fault.

Turning to FIGS. 6A-6E, example fault condition signatures are shown consistent with embodiments of the present disclosure. Span loss may be calculated by an LMS consistent with the present disclosure by dividing loss between two directions of propagation ranging from being entirely located in one of the two directions to being evenly divided between two directions. For example, FIGS. 6C and 6D show two span losses at the same position, with 6C showing loss in an inbound direction and FIG. 6D is in an outbound direction, respectively.

In FIGS. 6C and 6D, the sub peaks 601-1 to 601-4 illustrate different trends. In particular, dDLG at positions 4 and 5 in FIG. 6D are up since the repeaters after the span will seek to recover the loss of the gain. On the other hand, dDLG at position 3 and 4 go up in the inbound direction as shown in FIG. 6C. In the event span loss is a combination of inbound span and outbound span, then the dDLG at position 3 and position 5 will both go up. Therefore, span loss may be assigned to two directions by a ratio of inbound span loss using the following equation:

$$r_{in} = \frac{1}{1 + \exp\left(-\frac{\delta}{Pm}\right)} \quad \text{Equation (15)}$$

where =y1(j−1)−y1(j+1), in this case j=4 and Pm is a function related to y1(N).

However, for a shore span loss such as shown in FIG. 6E, the initial dDLG data may be missing, so a shore span loss prediction function y=p(x) may be used to estimate/predict the dDLG before the first repeater R1:

$$dDLG(0) = p(dDLG(1), dDLG(2)) \quad \text{Equation (16)}$$

Therefore, Equation (16) may be used to calculate shore span loss and assign directions.

Figure 8:
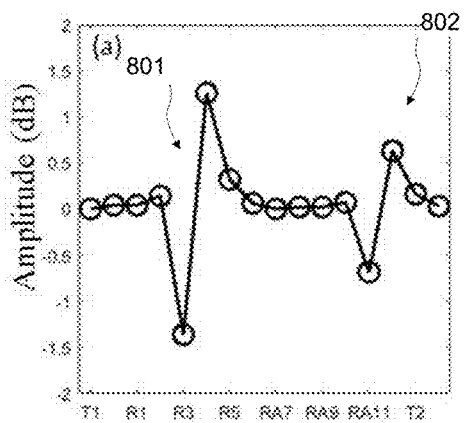
FIG. 8 shows a plurality of fault signatures detected along a transmission system in accordance with an embodiment of the present disclosure.
Figure 9A:
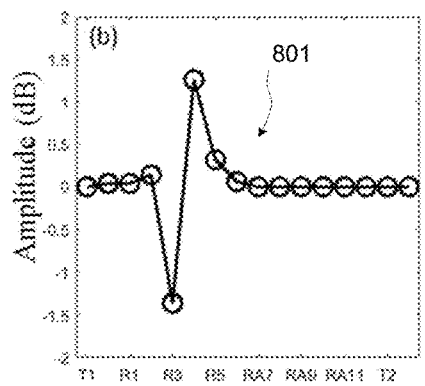
FIGS. 9A and 9B show the plurality of fault signatures of FIG. 8 decomposed into separate fault signatures, in accordance with an embodiment of the present disclosure.
Figure 9B:
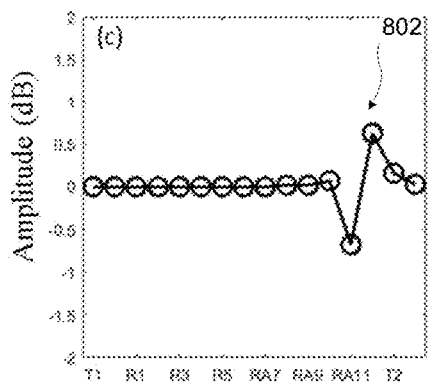

In some cases, multiple fault signatures corresponding to different physical locations along the WDM transmission system 100 may occur. The eASA 301 may detect each individual fault signature and quantify a plurality of associated wet plant change events present along the transmission path. In an embodiment, the fault signatures corresponding to the different fault events can be decomposed mathematically. For instance, as shown in FIG. 8, the peaks 801 and 802 may be isolated and decomposed into separate and distinct signatures as shown in FIGS. 9A and 9B, respectively. The isolated/decomposed signatures may then be individually analyzed by the eASE 301 as discussed above.

In some scenarios, specific faults may be detected by an LMS without necessarily performing automatic signature analysis on the HLLB data. For instance, HLLB data corresponding to a single amplifier pair may be utilized to detect a fiber break along the transmission path. Consider a situation in which a fiber is broken between repeater j−1 and repeater j. As a result, HLLB data for the following/downstream repeaters after repeater j (or j−1) cannot be received. For example, in FIG. 2, a fiber break could occur between R3 and R4. Therefore, the LMS 140 in T1 may not receive return signals from R4, R5, R6 and T2.

Similarly, T2 may not detect return signals from R3, R2, R1 and T1. In this case, the amplitudes of all missed peaks may be shown as a predefined value, e.g., −55 dB, in order to be displayed on the data plots. For a system with two end terminals, the total number of missing peaks in the HLLB data set from both ends should be greater than or equal to the total number of loopback paths, depending on whether there is a single fiber break or multiple breaks at different physical locations. For a system with one end terminals (e.g. branch), the total number of missing peaks may appear more than two in a row. Thus, the fiber break fault condition and the location of the fault condition may be detected based on the location and total number of the missing HLLB data points.

The HLLB data corresponding to a single amplifier pair may also be utilized to detect failure of an optical filter within an HLLB path. Consider a case where there is a fiber break within the loopback path of an amplifier pair at repeater j. In this case, the HLLB loopback signals at all measurement frequencies from only that amplifier-pair will not be received and will be marked as −55 dB (or other predefined dB value). Unlike the fiber break in the transmission path, as discussed above, the loopback signals from all other downstream amplifier-pairs along the optical path will still be received by an LMS. For example, in FIG. 2, with a loopback path break at repeater R3, the $HLLB_3$ will be marked as −55 dB. During subsequent processing, the eASA 301 may ignore/discard the data point for $HLLB_3$. In any event, the optical filter fault condition and the location of the fault condition may be detected based on the location of the missing HLLB data points at a single repeater.

The HLLB data corresponding to a single amplifier pair may also be utilized to detect failure of an optical filter within a given HLLB path (see FIGS. 6A and 6B). In each direction of propagation along the WDM transmission system 100, each HLLB path may include wavelength-selective optical filters to select the optical frequencies that get reflected in the opposite direction of propagation. In general, there are two measurement frequencies per optical band (e.g., C-band versus C+L), although more are possible and the particular number may be application-specific. In one specific example embodiment, at least two optical frequencies per optical band are selected as measurement frequencies. The selected measurement frequencies may correspond with the respective edges of the spectrum band, e.g., high and low wavelengths of the spectrum, although other embodiments are within the scope of this disclosure. Using two or more optical frequencies in this manner may advantageously allow an LMS consistent with the present disclosure to measure spectrum tilt as discussed in greater detail below.

Continuing on, when one optical filter is broken, for example in the loopback path of the repeater R3 to T1 (FIG. 2), then the return signal to T1 at that measurement frequency ($HLLB_{T1,3}$) will be missing in the data set, and thus $DLG_3$ and $DLG_4$ corresponding with R3 and R4, respectively, will be influenced. Optical filter faults within HLLB paths may therefore be detected/inferred by identifying the missing data point. Note, $DLG_3$ may still be derived via measurement data from T2, as the loopback path between R3 and T2 remains operational. In this case, $DLG_3$ may be given by:

$$DLG_3 = HLLB_{T1,3} - HLLB_{T1,2} = HLLB_{T2,2} - HLLB_{T2,3} \quad \text{Equation (17)}$$

And thus, the missing $HLLB_{T1,3}$ data point can be predicted/estimated by:

$$HLLB_{T1,3} = HLLB_{T1,2} + HLLB_{T2,2} - HLLB_{T2,3} \quad \text{Equation (18)}$$

Thus, failure of an optical filter within a given HLLB path and the location of the fault condition may be detected based on the missing HLLB data points at only one repeater (and the fact that data points are present for one measurement frequency at the given repeater).

After the eASA 301 identifies the location and amplitudes of each of the change events in the transmission path since the most-recent re-baselining in each physical location, the identified change events may then be used to calculate updates in RPT data stored in the RPT storage 303. The RPT data may include operational parameter values for each amplifier and adjacent fiber span/segment in a monitored fiber pair. The calculated changes from the eASA 301 may then be used to adjust RPT reference data within the RPT table to produce new absolute values for each operational parameter (See FIG. 12). Therefore, operational parameters associated with each monitored amplifier/span may be individually reported on without direct communication with the elements via the optical transmission path. This may advantageously allow for relatively simple wet plant devices and may avoid additional traffic being introduced onto the same.

As shown in FIG. 12, with additional reference to FIG. 11, the operational parameters reportable by an LMS consistent with the present disclosure may include, for example, input power, output power and gain, and/or amplifier accumulated gain tilt. To provide the reportable parameters, the LMS can use HLLB data to detect pump power and span loss changes, amplitude, and direction, and then use those changes to calculate changes operational parameter values based on an amplifier model. The amplifier model may be used, in a general sense, to derive values that quantify the relationship between reportable operational parameters and a fault in the system. For instance, consider the outbound direction (e.g., upper half) of repeater N in FIG. 11. Input power change can be calculated based at least in part by the output power change of repeater N−1 minus the span loss change between the repeater N and N−1 in the outbound direction. Output power change can be calculated based at least in part by input power change summed with the optical gain change. Thus, gain changes may then be calculated via the amplifier model based on the determined change of pump laser(s).

In an embodiment, the RPT updater 302 performs an RPT update process based on the most-recent ASA results output by the eASA 301 and the loopback data 308. In this embodiment, the RPT update process utilizes an amplifier model provided for each amplifier pair. The RPT update process also utilizes an initial input set of RPT values for all parameters and all monitored amplifier pairs which may be provided by a field technician during deployment or during staging, for instance.

In an embodiment, the amplifier model may be used to calculate the change in amplifier output power in response to a detected decrease in pump laser power, and to calculate the change in amplifier output power in response to a detected increase in fiber span insertion loss and corresponding reduction in amplifier input power. The relation between amplifier input power, output power and gain, and the span loss of the adjacent fiber span can be given by:

$$P_{out,i} = P_{in,i} + G_i \quad \text{Equation (19)}$$

$$P_{in,i+1} = P_{out,i} - S_{i,i+1} \quad \text{Equation (20)}$$

where $P_{out,i}$ is the output power of repeater Ri, $P_{in,i}$ is the input power of repeater Ri, $G_i$ is the gain of repeater Ri, $S_{i,i+1}$ is the span loss between repeater Ri and repeater Ri+1.

A decrease in amplifier laser pump results in a decrease in output power and gain, G, for the affected amplifier, and a decrease in input power and increase in gain for the following/subsequent down-stream amplifier. The accumulated gain tilt of both amplifiers are affected, but with opposite amplitude, so that there is little accumulated impact on the tilt of downstream amplifiers.

An increase in fiber span insertion loss (S), results in a decrease in the input power of the adjacent amplifier and possibly the next-adjacent amplifier, and an increase in G in both amplifiers. The accumulated gain tilt of both amplifiers and all downstream amplifiers are affected.

The change in round-trip gain shape can be inferred from changes in the relative peak height of the HLLB peaks on either extreme of the fiber pair spectrum band as follows:

$$\Delta Tilt_i = dDLG_{i,HF} - dDLG_{j,LF} \qquad \text{Equation (21)}$$

where the $dDLG_{j,HF}$ is the high frequency differential of differential loop gain at repeater $R_i$, and the $dDLG_{j,LF}$ is the low frequency differential of differential loop gain at repeater Ri.

However, the distribution of this change in gain shape between the two directions of propagation can be more difficult to measure. The detected changes in round trip tilt may be assigned to a propagation direction based on the directionality of the detected span loss and pump power change events from the ASA process 700 above. For example, if a span loss increase occurs only in one direction of propagation, then any change in detected gain tilt is assigned to that direction of propagation. When multiple faults (N) appear simultaneously, the dDLG may be decomposed into N parts (e.g., see FIGS. 8, 9A and 9B) and each corresponds to one single fault. Then the tilt can be calculated individually and added up to form a collective tilt.

Returning to FIG. 3A, an overall LMS process, e.g., generally depicted as a work flow in FIG. 3B, may perform a Baseline Manager process to ensure that new HLLB data sets are analyzed by the ASA. The Baseline Manager process may also maintain synchronization between the baseline data sets for both the ASA analysis of HLLB data and the RPT update of current RPT values based on previously determined RPT values.

In some cases, configurable threshold values may be provided to determine the amplitude of ASA or RPT update results that will trigger the overall process to execute either localized or global updating of the RPT and HLLB baseline data sets. In general, updating the baseline data sets for LMS comparisons allows new faults to be detected near existing faults without the ASA analysis being impaired by the presence of overlapping fault signatures. Thus, baseline data sets may be updated on specific repeater span(s) adjacent an event that caused the faults/changes, which in turn avoids re-baselining the entire system in order to allow for other parts of the network to be monitored relative to their previous/earlier values. For example, in some cases six (6) data points may be used for fault shape detection, and those 6 points near an event may each be updated so that the influence of a current fault will be minimized or otherwise reduced. However, other amounts of data points may be utilized and the provided example is not intended to be limiting.

In some cases, the RPT and HLLB baseline data sets may not be updated based on relatively minor/small change events. Detection accuracy can be better for larger faults, so continuing to monitor total fault amplitude as a fault continues to grow may be advantageous instead of continuously updating the baseline and then continuously monitoring small changes in fault amplitude. For example, it is beneficial to monitor a span loss change that is slowly growing from 1 dB to 3 dB, instead of constantly re-baselining when the fault increases by 1 dB. Also, there is less accumulation of detection inaccuracy when the RPT update results of each LMS cycle are based on the reference RPT values and the current ASA results, instead of the cycle-by-cycle accumulation of inaccuracy when the results of each cycle are added to the results of the previous cycle.

Consider a scenario wherein a first fault in the system of FIG. 2 exceeds the threshold for localized baseline updating, but a second fault does not. The first fault will be incorporated in the HLLB baseline data by injecting the change of HLLB caused by fault ($\Delta HLLB_{i,j}$) into the baseline so that the next run will only show the second fault, as is shown in FIG. 9. In this example, the DLG corresponding to the fault that does not exceed the threshold may be set to zero/nulled and the DLG having the fault that exceeds the threshold may be kept. Thus, the change of HLLB baseline data may then be given:

$$\begin{cases} DLG_j + \Delta HLLB_{T1,j-1} = \Delta HLLB_{T1,j} \\ \Delta HLLB_{T1,T1} = 0 \\ DLG_j + \Delta HLLB_{T2,j} = \Delta HLLB_{T2,j-1} \\ \Delta HLLB_{T2,T2} = 0 \end{cases} \qquad \text{Equation (22)}$$

The newly generated HLLB baseline $(HLLB_{i,j})_{new}$ can be calculated from the old HLLB baseline $(HLLB_{i,j})_{old}$ by:

$$(HLLB_{i,j})_{new} = (HLLB_{i,j})_{old} + \Delta HLLB_{i,j} \qquad \text{Equation (23)}$$

Figure 10:
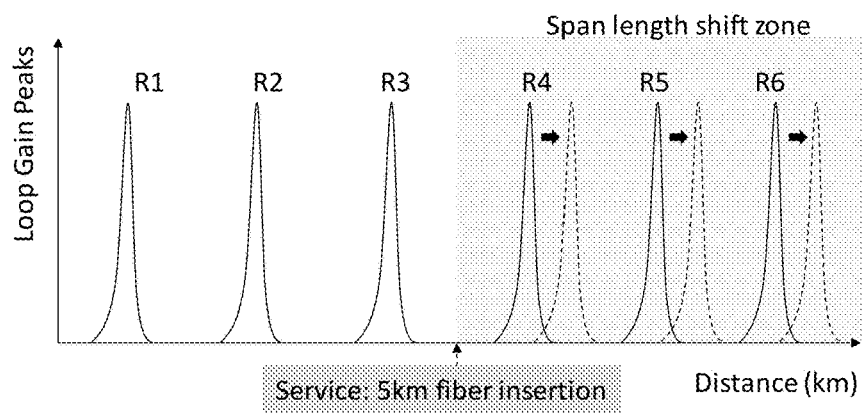
FIG. 10 is a graph showing loop gain shifts after increasing the overall length of an optical transmission system, in accordance with an embodiment of the present disclosure.

After repair, a fiber may be inserted into the original system to shift the peaks, as is shown in FIG. 10. An LMS consistent with the present disclosure may then update the distance change automatically using the received loopback data 308. If the distance data is different from two ends, an averaged value may be used.

Figure 13:
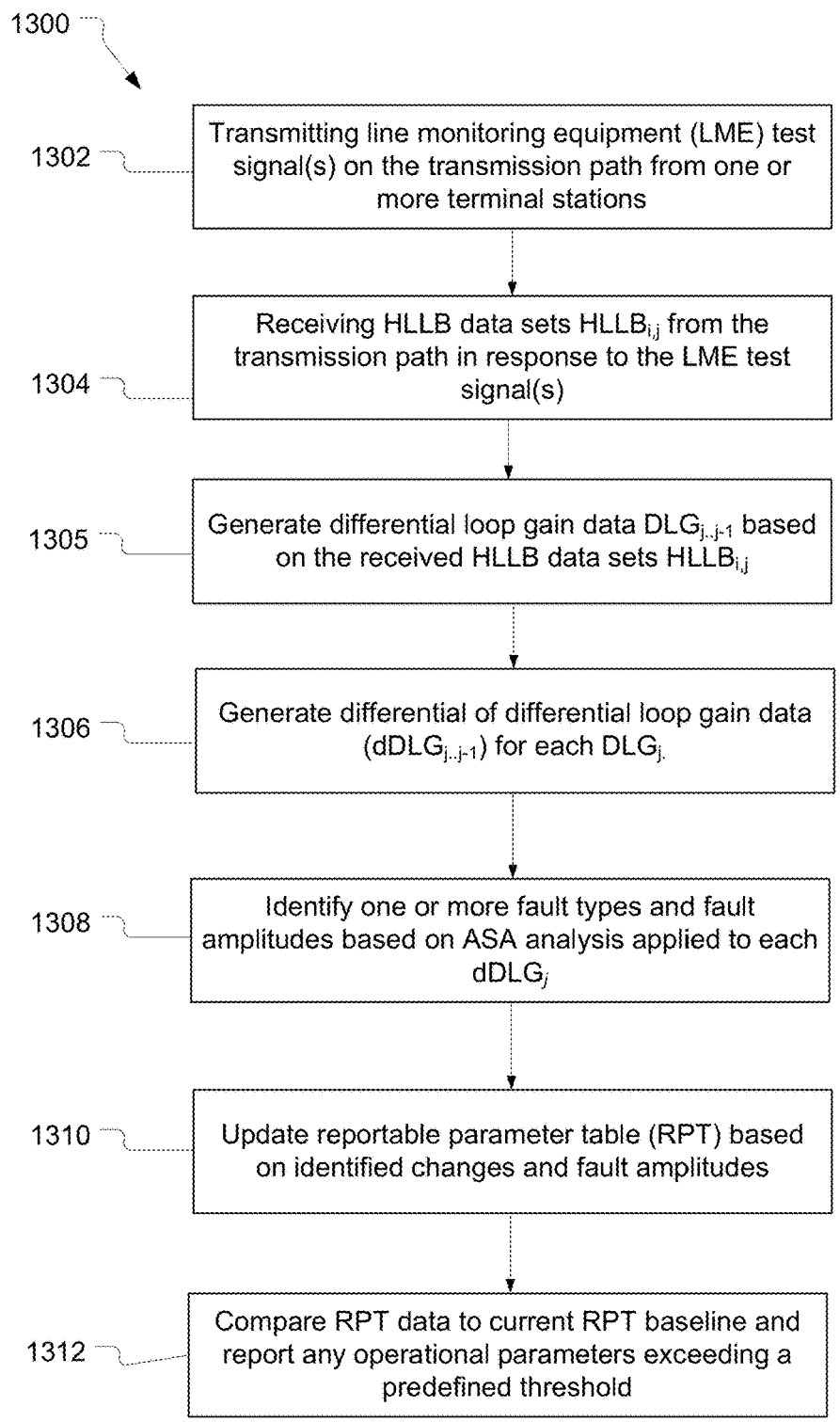
FIG. 13 is a flow chart illustrating operations according to a method consistent with the present disclosure.

FIG. 13 is a flow chart illustrating one exemplary embodiment 1300 of a fault detection process that may be performed by an LMS consistent with the present disclosure. Exemplary details of the operations shown in FIG. 13 are discussed above. As shown, the method 1300 includes transmitting 1302 line monitoring equipment (LME) test signal(s) on the transmission path from one or more terminal stations. The method 1300 may then receive 1304 loopback data in the form of HLLB data sets ($HLLB_{i,j}$) from the transmission path in response to the LME test signal(s).

The method 1300 may then generate 105 differential loop gain data $DLG_{j,j-1}$ based on the received HLLB data sets $HLLB_{i,j}$ using Equation (1) The method 1300 may then generate 1306 differential of differential loop gain data sets ($dDLG_j$) by subtracting loopgain values in each $DLG_j$ data set with values in a corresponding loopgain value baseline dataset using Equation (2), for example. Additional preprocessing in act 1306 may further include applying error reduction to each $dDLG_j$ using Equation (4), and weighting and mapping of loop gain values based on Equations (5)-(7).

The method 1300 may then identify 1308 one or more fault types and fault amplitudes based on ASA analysis. One example process 700 for ASA analysis is discussed above with regard to FIG. 7, which will not be repeated for brevity. The method 1300 may then update 1310 a reportable paramters table (RPT) based on identified changes, e.g., input power changes, output power changes, gain, tilt, and so on, for each of the repaters and associated elements represented within the $dDLG_j$ data. The method 1300 may then include comparing 1312 updated data in the RPT table to the current baseline RPT. In response to one or more operational parameters exceeding a predefined threshold, sending a reporting message to a user or other monitoring process. The reporting message may comrpise, for instance, one or more of an identifier of a repeater, an identifier of an operational parameter, and/or an operational parameter value.

In accordance with an aspect of the present disclosure an optical communication system is disclosed. The optical communication system comprising an optical transmission path, a plurality of repeaters coupled to the optical transmission path, each of the repeaters comprising a high loss loopback (HLLB) path, first line monitoring equipment (LME) coupled to the first end of the transmission path, the first LME being configured to transmit first LME test signals on the optical transmission path and receive first LME loopback data from the optical transmission path in response to the LME test signals, the first LME loopback data comprising a peak associated with the location of each of the HLLB paths on the transmission path, a controller coupled to the first LME, the controller to generate a plurality of operational parameters based on the first LME loopback data, each of the operational parameters corresponding to a repeater of the plurality of repeaters, select one or more repeaters of the plurality of repeaters, and send a reporting message to a remote computer, the reporting message including a representation of one or more operational parameters of the plurality of operational parameters associated with each of the selected repeaters.

In accordance with another aspect of the present disclosure a method of monitoring an optical transmission path in an optical communication system is disclosed. The optical transmission path including a plurality of repeaters coupled to the transmission path, each of the repeaters comprising a high loss loopback (HLLB) path, and the method comprising transmitting a first line monitoring equipment (LME) test signal on the transmission path, receiving first LME loopback data from the transmission path in response to the first LME test signal, the first LME loopback data having peaks associated with a location of each of the HLLB paths on the transmission path, storing LME baseline data in a memory based on the first LME loopback data, and sending a reporting message to a user, the reporting message including at least one operational parameter associated with a repeater of the plurality of repeaters based on the stored LME baseline data.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto.

Embodiments of the methods described herein may be implemented using a controller, processor and/or other programmable device. To that end, the methods described herein may be implemented on a tangible, non-transitory computer readable medium having instructions stored thereon that when executed by one or more processors perform the methods. Thus, for example, the LMS 300 may include a storage medium to store instructions (in, for example, firmware or software) to perform the operations described herein. The storage medium may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

It will be appreciated by those skilled in the art that any block diagrams herein represent conceptual views of illustrative circuitry embodying the principles of the disclosure. Similarly, it will be appreciated that any block diagrams, flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks labeled as "processor", may be provided through the use of dedicated hardware as well as hardware capable of executing software in association with appropriate software. The functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Although the methods and systems have been described relative to a specific embodiment thereof, they are not so limited. Obviously, many modifications and variations may become apparent in light of the above teachings. Many additional changes in the details, materials, and arrangement of parts, herein described and illustrated, may be made by those skilled in the art.

What is claimed is:

1. An optical communication system comprising:
   an optical transmission path;
   a plurality of repeaters coupled to the optical transmission path, each of the plurality of repeaters comprising a high loss loopback (HLLB) path;
   first line monitoring equipment (LME) coupled to a first end of the transmission path, the first LME being configured to transmit first LME test signals on the optical transmission path and receive a first LME loopback data from the optical transmission path in response to the first LME test signals, the first LME loopback data comprising a peak associated with a location of each of the HLLB paths on the transmission path;

a controller coupled to the first LME, the controller to:
generate a plurality of operational parameters based on the first LME loopback data, each of the operational parameters corresponding to a repeater of the plurality of repeaters, wherein each of the plurality of operational parameters are stored in a lookup table in a memory, the lookup table associating each of the plurality of repeaters with corresponding operational parameters;
select one or more repeaters of the plurality of repeaters; and
send a reporting message to a remote computer, the reporting message including a representation of one or more operational parameters of the plurality of operational parameters associated with each of the selected repeaters.

2. The optical communication system of claim 1, wherein each of the plurality of operational parameters comprise at least one of an output power value, a gain value, and/or amplifier accumulated gain tilt value.

3. The optical communication system of claim 1, wherein the reporting message is sent in response to the controller receiving a Command-Response (CR) message from a user.

4. The optical communication system of claim 3, wherein the CR message includes at least one repeater identifier, and wherein each of the selected one or more repeaters of the plurality of repeaters correspond with the at least one repeater identifier.

5. The optical communication system of claim 1, the controller further to:
store the first LME loopback data as a current baseline loopback data in a memory;
receive a second LME loopback data in response to second LME test signals being transmitted on the transmission path by the first LME;
compare the received second LME loopback data to the current baseline loopback data to identify a change of at least a first operational parameter and an associated repeater of the plurality of repeaters; and
update an operational parameter of the plurality of operational parameters corresponding with the associated repeater based on the identified change.

6. The optical communication system of claim 5, wherein the updated operational parameter is updated based on an output of an amplifier model.

7. The optical communication system of claim 5, wherein the controller is further to send an alert message to a user based on the updated operational parameter exceeding a predefined threshold.

8. The optical communication system of claim 5, further comprising an automatic signature analysis (ASA) processor, and wherein the identified change of the first operational parameter is identified based at least in part on analysis of at least the first LME loopback data by the ASA processor.

9. The optical communication system of claim 1, wherein the first LME test signals comprise a plurality of channel wavelengths, the plurality of channel wavelengths including a low value corresponding to a minimum channel wavelength of a bandwidth associated with the optical transmission path, and a high value corresponding with a maximum channel wavelength of the bandwidth associated with the optical transmission path.

10. The optical communication system of claim 1, wherein each of the plurality of repeaters include at least first and second amplifiers to propagate optical signals in a first and a second direction, respectively, and wherein the first and second amplifiers implement an asymmetrical pumping configuration whereby output power in the first direction is different from output power in the second direction.

11. The optical communication system of claim 1, further comprising:
a second LME coupled to a second end of the transmission path, the second LME being configured to transmit second LME test signals on the transmission path and receive a second LME loopback data from the transmission path in response to the second LME test signal, the second LME loopback data comprising a peak associated with the location of each of the HLLB paths on the transmission path; and
wherein the plurality of operational parameters are generated based on the first LME loopback data and the second LME loopback data.

12. A method of monitoring an optical transmission path in an optical communication system, the optical transmission path including a plurality of repeaters coupled to the transmission path, each of the repeaters comprising a high loss loopback (HLLB) path, the method comprising:
transmitting a first line monitoring equipment (LME) test signal on the transmission path;
receiving a first LME loopback data from the transmission path in response to the first LME test signal, the first LME loopback data having peaks associated with a location of each of the HLLB paths on the transmission path;
storing a LME baseline data in a memory based on the first LME loopback data;
sending a reporting message to a user, the reporting message including at least one operational parameter associated with a repeater of the plurality of repeaters based on the stored LME baseline data; and
transmitting a second LME test signal on the transmission path; and
receiving a second LME loopback data from the transmission path in response to the second LME test signal, the second LME loopback data having peaks associated with the location of each of the HLLB paths on the transmission path, wherein the LME baseline data stored in the memory is based on the received first and second LME loopback data.

13. The method of claim 12, wherein the operational parameter comprises at least one of an output power value, a gain value, and/or amplifier accumulated gain tilt value.

14. The method of claim 12, wherein the report message is sent in response to receiving a request message from the user, the request message including an identifier of at least one repeater of the plurality of repeaters.

15. The method of claim 12, the method further comprising:
storing a plurality of operational parameters in a memory, the plurality of operational parameters based on the received first LME loopback data;
receiving the second LME loopback data in response to second LME test signals being transmitted on the transmission path by the first LME;
comparing the received second LME loopback data to the stored loopback data to identify a change in at least a first operational parameter and an associated repeater of the plurality of repeaters; and
in response to the identified change exceeding a first predefined threshold, updating an operational parameter of the plurality of operational parameters corresponding with the associated repeater based on the identified change.

* * * * *